S. W. BROWN.
Steam and Water-Pressure Gage.
No. 15,058.
Patented June 10, 1856.
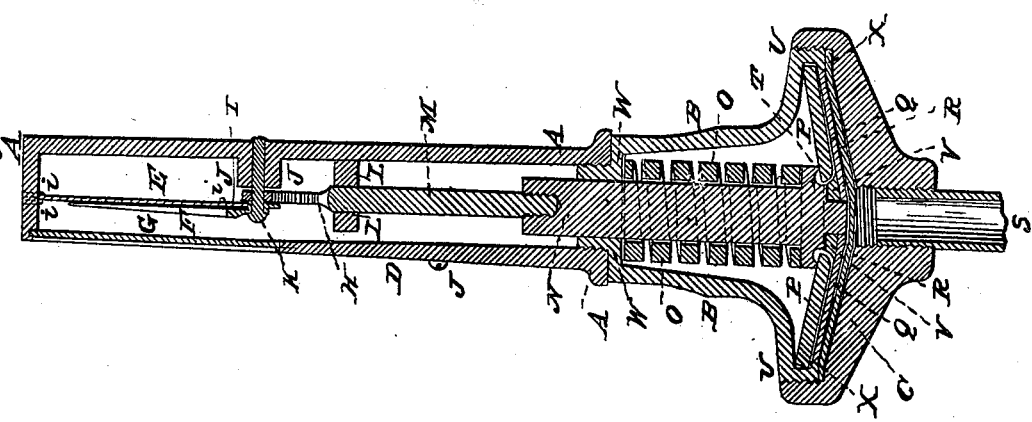
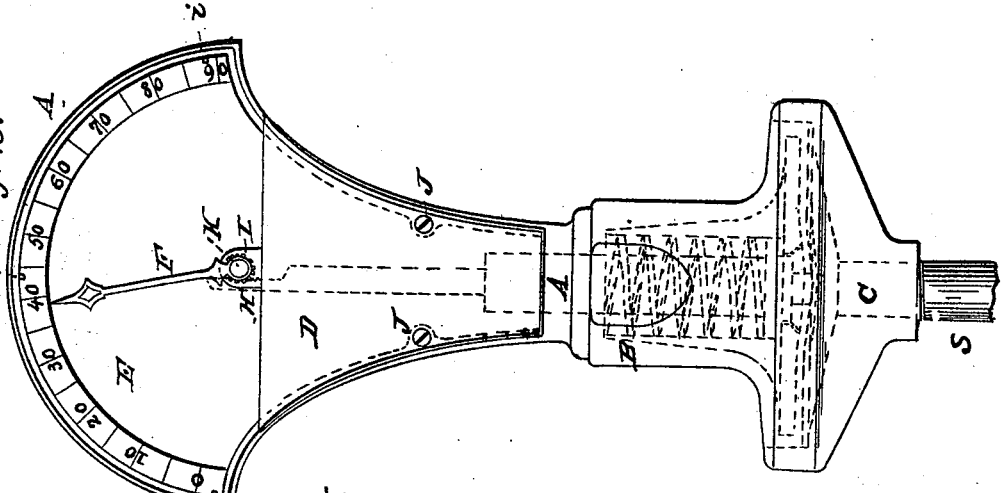
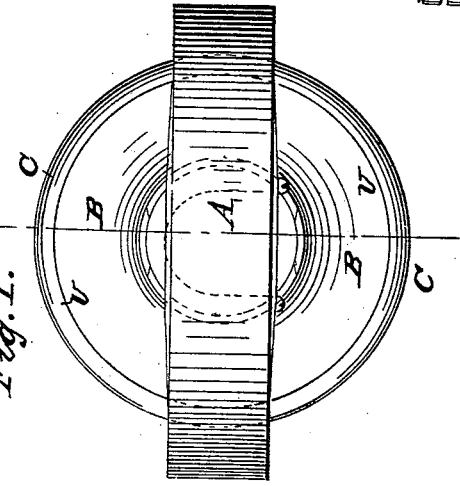
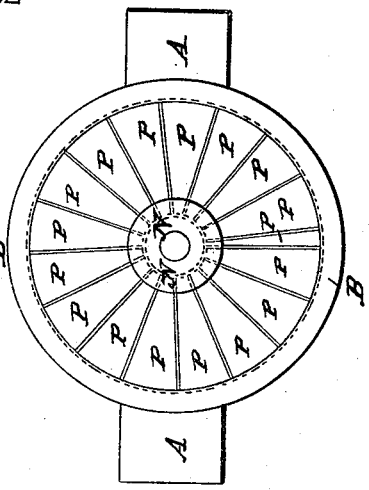

UNITED STATES PATENT OFFICE.

SAML. W. BROWN, OF LOWELL, MASSACHUSETTS.

STEAM-PRESSURE GAGE.

Specification of Letters Patent No. 15,058, dated June 10, 1856.

*To all whom it may concern:*

Be it known that I, SAMUEL W. BROWN, of Lowell, in the county of Middlesex and Commonwealth of Massachusetts, have invented a new and useful Improvement in Steam and Water Pressure Gages; and I hereby declare that the following specification, in connection with the accompanying drawings and references thereon, constitutes a lucid, clear, and exact description of the construction and use of the same.

In referring to said drawings, Figure 1, denotes a plan or top view. Fig. 2, a front elevation of the same. Fig. 3, a transverse and vertical section of the same on line A, B, Figs. 1 and 2. Fig. 4, is a view of the bottom of the part B, with the part C, unscrewed or removed therefrom, showing the radial arms P, P, &c. Fig. 5, is an elevation of the spring O disconnected from the gage.

*Invention.*—The nature of my invention consists in the following described arrangement of piston, radial arms which are stiff, and a flexible packing which covers the joints steam tight between these radial arms, as they are moved up and down by the greater or less pressure of steam or water, and for correctly indicating the pressure thereof by the intermediation of a spring or its equivalent between the radial arms P, P, &c., and the indicating hand, or near to either the radial arms or indicating hand, as will be hereafter seen.

*Construction.*—To enable persons skilled in the art to which my invention appertains to construct and carry out the same, I will describe it as follows.

I construct a case of cast iron or other material as seen at B, and C, joined together by means of a screw joint seen at U, the upper end or portion of the part B, is perforated to receive the piston as seen at N and allow it to freely slide up and down therein. I construct a number of radial arms or levers seen at P, P, &c., which are stiff and rigid, one end of each of which rests upon a portion of the case B, but are not in any manner connected to the case B. The opposite ends of these radial arms rest against the collar T, T, which forms part of the piston N, but these arms are not fastened or connected to the collar T. Immediately underneath the inner ends of the rigid radial arms P, P, I place a collar seen at V, and immediately under both the collar T, and radial arms P, P, &c., I place a leather disk seen at Q, and under this I place a packing disk of vulcanized india rubber, or some equivalent substance seen at R, which constitutes the packing joints seen at X between the part B, and part C, of the case which are screwed together by the screw seen at U, thereby compressing the out edge of the flexible packing R between them, which constitutes a tight joint and prevents any steam from passing up into the interior of the gage about the spring O, or from between the arms P, P.

By my arrangement of rigid radial arms and packing I obtain at all times a regular even, rigid, surface on the radial arms which support the packing R, this packing answering to keep all the joints between the radial arms steam tight, while the arms effectually support the packing R in all working positions, so as to not allow it to bag, or be strained, which would be the case if any open work were substituted for the radial arms.

I construct a permanently elastic spring seen at O, the upper end of which fits the shoulder W, of the part B, and its lower end rests against the collar T. To the lower part of the case I attach the tube S for conducting the steam from the boiler, or to conduct the water or other liquid to the gage for indicating the pressure of this liquid, or steam as the case may be.

To the top of the piston N, I secure a shaft seen at M guided by the stand L, and which terminates in the rack H, at the top. This rack connects with and turns the pinion I, to which the hand E, is affixed for indicating on the dial plate E the number of lbs. pressure of steam, or the height of the liquid; the pinion I turns on the stud K which is secured to the hub J, formed on the back part of the case A.

The case A is constructed of cast iron, or other material and is joined to the part B by a screw at its lower end, as will be seen in the drawing. This case A contains the indicating hand or pointer F, the dial E which is held to the case A by the pins i, i, and this case also contains the pinion I and rack H by which the hand F is operated. A door is formed, seen at D, for closing the lower portion of the case A, and is held in position by the screws J, J. In front of the dial E, I place a glass seen at G for keeping out dust, dirt, &c., from the operating portions of my gage.

Fig. 5, indicates the spring O disconnected from the gage. This spring is made of the very best cast steel, and tempered a spring temper so that it may be permanently elastic.

I do not confine myself to the within described form of case, as a great variety of forms may be adopted all with the same successful result, providing the interior arrangement is or should be substantially the same.

*Operation.*—All that is necessary to operate my steam, and fluid pressure gage is to connect it tightly to the boiler for steam, or to other vessel for water or other liquid by a strong tube, and then let on the pressure of steam or water or other fluid as the case may be, which will cause the piston N to rise and to contract or press together the spring O more or less according to the intensity of the pressure from the boiler, or other vessel, and by the rising of this piston the shaft M and rack H rises and turns the pinion I carrying the hand F so that it will truly indicate the number of pounds pressure to the square inch, or so that it will indicate the height in feet and inches of water, or other fluid as may be desired and which may be done by first properly graduating the gage for either purpose as may be desired.

What I claim as my invention and desire to secure by Letters-Patent is—

The combination of the rigid radial arms P, P, with the flexible and elastic disk or surface R, for covering the joints of these radial arms steam tight, when yielding or moving, by the force of steam or water, to correctly indicate the pressure thereof, the radial arms P, P, being fitted so as to operate so close to each other as to prevent the surface R, from bagging, essentially in the manner and for the purposes fully set forth.

SAML. W. BROWN.

Witnesses:
 THOS. F. DEWHURST,
 E. W. SCOTT.